United States Patent

Rickel et al.

Patent Number: 5,854,924
Date of Patent: Dec. 29, 1998

[54] STATIC DEBUGGING TOOL AND METHOD

[75] Inventors: David Rickel, Sunnyvale, Calif.; James B. McBeath, Bellevue, Wash.

[73] Assignee: GLOBEtrotter Software, Inc., Campbell, Calif.

[21] Appl. No.: 689,458

[22] Filed: Aug. 8, 1996

[51] Int. Cl.⁶ .............................. G06F 9/44; G06F 11/00
[52] U.S. Cl. ...................... 395/704; 395/705; 395/707; 395/708; 395/183.14; 395/183.22; 395/185.05; 395/185.01; 395/185.1
[58] Field of Search ................................ 395/704, 705, 395/183.14, 707, 708, 185.01, 185.1, 183.13, 183.15, 183.21, 183.22, 185.04, 185.05

[56] References Cited

U.S. PATENT DOCUMENTS

| | | | |
|---|---|---|---|
| 5,119,377 | 6/1992 | Cobb et al. | 395/183.14 |
| 5,132,972 | 7/1992 | Hansen | 395/183.14 |
| 5,465,258 | 11/1995 | Adams | 395/704 |
| 5,586,328 | 12/1996 | Caron et al. | 395/705 |
| 5,673,390 | 9/1997 | Mueller | 395/185.1 |
| 5,699,507 | 12/1997 | Goodnow, II et al. | 395/183.14 |

OTHER PUBLICATIONS

Brace et al., "Efficient Implementation of a BDD Package," 1990, IEEE Design Automation Conference.

Sheldon B. Akers, "Binary Decision Diagrams," Jun. 1978, IEEE Transactions on Computers.

Randal E. Bryant, "Graph–Based Algorithms for Boolean Function Manipulation," Aug. 1986, IEEE Transactions on Computers.

*Primary Examiner*—James P. Trammell
*Assistant Examiner*—Tuan Q. Dam
*Attorney, Agent, or Firm*—Beyer & Weaver, LLP

[57] ABSTRACT

A static debugging tool for use with a computer and for debugging a binary program file includes an analyzer for causing the computer to statically analyze a representation of a binary program file to detect the presence of program errors and potential errors in the binary program file without executing the binary program file. The static debugging tool causes the computer to output an error list of the errors and potential errors detected by the analyzer. In a preferred embodiment, the analyzer detects the errors and potential errors in the representation of the binary program file by following all of the possible flow paths of the representation of the binary program file while tracking the use of various program parameters for any inconsistent use of the various program parameters. A method for statically debugging a binary program file is also described.

24 Claims, 12 Drawing Sheets

STATIC DEBUGGING TOOL AND METHOD

BACKGROUND OF THE INVENTION

The present invention relates generally to debugging tools for debugging software during development. More specifically, a static debugging tool is described which is arranged to debug binary input files without requiring the execution of the program being debugged.

One of the most time consuming aspects of software development is often the efforts spent tracking down formatting errors, variable type errors, and other errors that are made when the code is written. These difficulties have lead to the development of a wide variety of debugging tools that may be used by programmers to help in the debugging of their code. Presently, virtually all debugging tools do their debugging at the source code level and most debugging tools require that the code actually be executed to locate the errors.

Executing the program in order to debug the program requires the development of test suites designed to exercise the program in order to cause the various errors to exhibit themselves so that they can be identified and corrected. Although this approach works well in many circumstances, it does have several limitations. First the development of the test suites themselves can be expensive and time consuming. It may bet extremely difficult to identify and provide all of the test suites necessary to exercise all of the various possible flow paths which the program being debugged may take. Second, the quality of the debugging often relies heavily on the breadth and quality of the test suites, which at times may be lacking.

LINT is one example of a currently available source level debugging tool. LINT is a standard UNIX debugging tool which provides limited static debugging of source level code. However, LINT is not capable of following the code of the source program back through the various branches of the code making up the source program. This limits LINT's debugging capabilities making it difficult for LINT to identify and isolate several classes of errors. Other conventional debugging tools which use test suites to exercise the program file also have difficulty identifying and isolating certain classes of errors. Accordingly, there are continuing efforts to develop improved debugging tools that may be used in conjunction with or in place of existing tools in order to improve and stream line the software development process.

SUMMARY OF THE INVENTION

As will be described in more detail hereinafter, a static debugging tool for use with a computer and a method for debugging a binary program file without requiring the execution of the binary program file in order to detect the presence of program errors and potential program errors are disclosed. The static debugging tool includes an analyzer for causing the computer to statically analyze a representation of a binary program file to detect the presence of program errors and potential errors in the binary program file without executing the binary program file. The static debugging tool causes the computer to output an error list of the errors and potential errors detected by the analyzer.

In one embodiment of the present invention, the static debugging tool further includes a decompiler for causing the computer to decompile the binary program file. The decompiler translates the binary program file into an intermediate, machine independent program file that serves as the representation of the binary program file to be analyzed by the analyzer of the static debugging tool. A hint file may also be included for providing user information to the static debugging tool that is specific to the binary program file being decompiled.

In another embodiment, the debugging tool may include a system call and restrictions library file for providing information to the static debugging tool which is specific to a particular system that the binary program file is designed to be used. This system call and restrictions library may include certain constraints and parameter definitions that are specific to a particular system on which the binary program file is intended to be used.

In another embodiment, the static debugging tool includes an arrangement for determining and symbolically representing the function flow of the binary program file. The static debugging tool also includes an arrangement for identifying the calls within the binary program file and symbolically representing the structural relationships of the calls in a call graph. The analyzer detects the errors and potential errors in the binary program file by following all of the possible flow paths of the binary program file while tracking the use of various program parameters for any inconsistent use of the various program parameters throughout the binary program file. These various program parameters which the analyzer tracks may include checking for the return of an automatic address within the binary program file and/or checking for any inconsistent use of a certain variable type within the binary program file.

In another embodiment, the static debugging tool symbolically executes a symbolic representation of the binary program file to detect the presence of program errors and potential errors in the binary program file. This symbolic representation of the binary program file may use binary decision diagrams to symbolically represent certain operations of certain functions of the binary program file.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE PREFERRED EMBODIMENTS

Figure 1A:
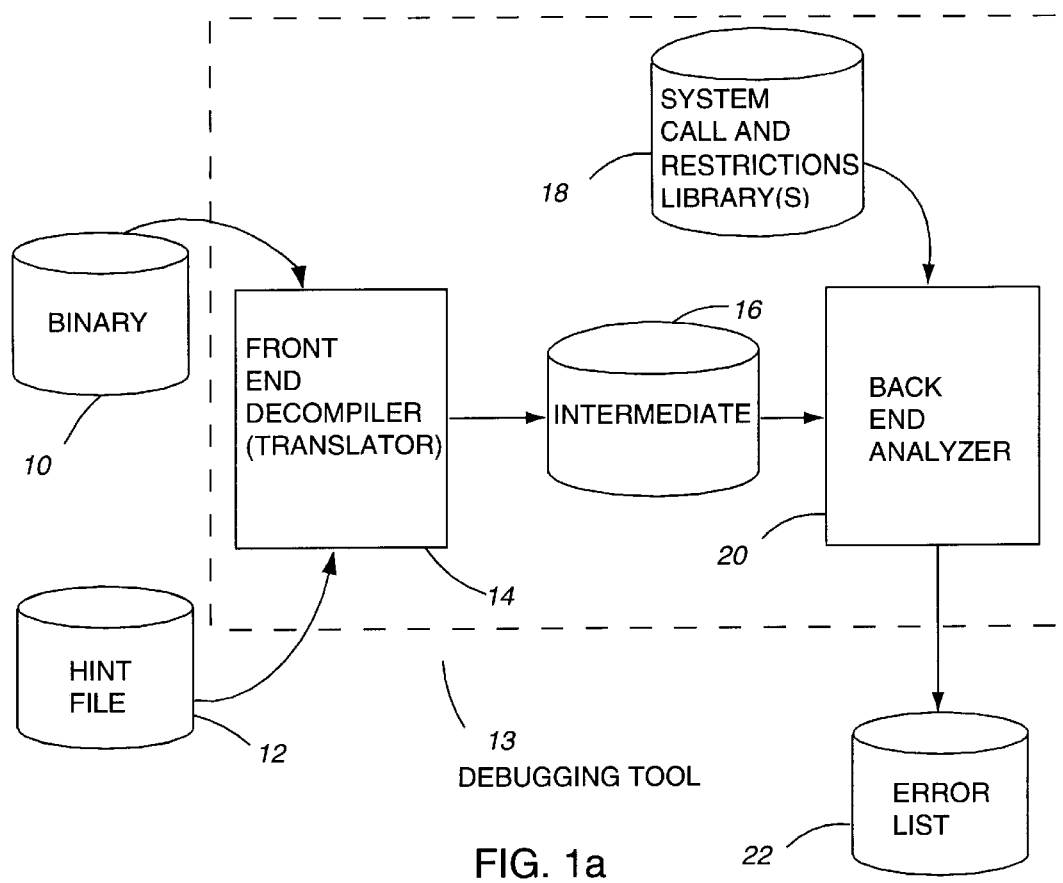
FIG. 1a is a block diagram of a static debugging tool in accordance with one embodiment of the present invention.

Referring next to the drawings, one preferred embodiment for implementing the static debugging tool of the present invention will be described. Referring initially to FIG. 1 a, the static debugging tool 13 is arranged to accept a binary program file 10 and output an error list 22 which identifies errors and/or potential errors in the binary program file 10. This static debugging tool 13 may also utilize a hint file 12 and/or a system call and restrictions library(s) 18 as resources that assist in the error identification process.

As will be understood by those skilled in the art, debugging tool 13 may be arranged to operate on a wide variety of general purpose computers in order to provide the static debugging functions of the present invention. FIG. 1b illustrates the major components of a representative computer, generally indicated by reference numeral 23, suitable for use with debugging tool 13. Representative computer 23 includes a central processing unit (CPU) 24 which is coupled with random access memory (RAM) 25 and with read only memory (ROM) 26. Typically, RAM 25 is used as a "scratch pad" memory and includes programming instructions and data for processes currently operating on CPU 24. ROM 26 typically includes basic operating instructions and data used by computer 23 to perform its functions. In addition, a mass storage device 27, such as a hard disk, CD ROM, magneto-optical (floptical) drive, tape drive or the like, may be optionally coupled with CPU 24.

The above described computer may also include one or more input/output sources. In the example shown, computer 23 includes input/output sources 28 and 29. These input/output sources may take any suitable form such as a keyboard, pointer devices (e.g., a mouse or stylus), printer devices, and/or display connections. It will be appreciated by those skilled in the art that the above described hardware elements are of standard design and construction, and will be well familiar to those skilled in the art.

Figure 1B:
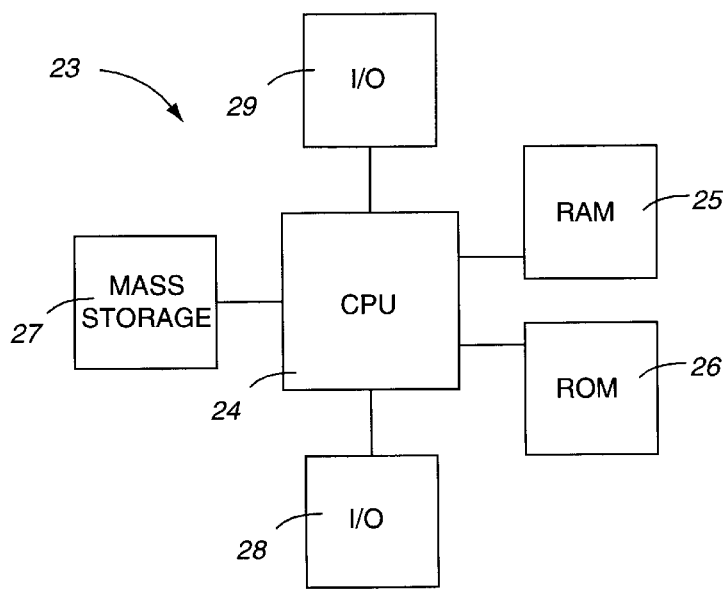
FIG. 1b is a block diagram of one embodiment of a computer capable of using the debugging tool of FIG. 1a in accordance with the present invention.

In the embodiment of the static debugging tool shown in FIG. 1a, debugging tool 13 includes a front end decompiler (translator) 14. When decompiler 14 is run on a computer such as computer 23, decompiler 14 receives the input binary file 10 and causes the computer to create an intermediate disassembled file 16 that is essentially a disassembled version of binary file 10. In accordance with one aspect of the invention, decompiler 14 causes the computer to create the intermediate file 16 in a machine-independent format and provide intermediate file 16 to a back end analyzer 20. This machine independent format of intermediate file 16 allows back end analyzer 20 to cause the computer to analyze a wide variety of binary program files regardless of the particular machine for which the binary file being debugged was created.

The front end decompiler 14 makes use of hint file 12 in creating the intermediate file 16 and is capable of identifying several classes of potential programming errors. Hint file 12 may contain a variety of program specific information which may be input by the user. This information may include acceptable ranges for particular variables, function argument and return types, details about what global data functions may read or modify, details about what data pointed at by arguments may be read or modified, details on how to interpret arguments to functions that might take different numbers and types of arguments (varargs functions), and a variety of other specific information.

Similarly, system call and restrictions library(s) 18 provides system or machine specific information to back end analyzer 20. This information may also include acceptable ranges for particular variables, function argument and return types, details about what global data functions may read or modify, details about what data pointed at by arguments may be read or modified, details on how to interpret arguments to functions that might take different numbers ant types of arguments (varargs functions), and other system and/or machine specific formatting and parameter restrictions. System call and restrictions library(s) 18 may include a library for each of a variety of particular systems or machines. These libraries assist in allowing back end analyzer 20 to analyze a wide variety of binary program files regardless of the particular machine for which the binary program file being debugged was created.

The power of the described static debugging tool 13 is primarily in the back end analyzer 20. Specifically, the back end analyzer is arranged to receive and analyze the machine-independent intermediate file 16. The back end analyzer 20 makes use of the system call and restrictions library(s) 18 during its analysis and is arranged to detect a variety of common programming error types. In the described embodiment, the back end analyzer is substantially independent of the programming language used to create the code being analyzed and is substantially independent of the platform or machine that the code is intended to run upon.

As will be described in more detail hereinafter, back end analyzer 20 detects program errors and potential program errors in the binary program file by following all of the possible flow paths of the binary program file. As analyzer 20 follows the various possible flow paths, the use of various program parameters are tracked and checked for any inconsistent use of the various program parameters throughout the binary program file. This is done statically without executing the binary program file. This basic approach may be used to detect a wide variety of program errors including, errors which are very difficult to detect using conventional debugging tools. Therefore, the static debugging tool of the present invention allows binary program files to be debugged without requiring expensive test suites to be provided as mentioned in the background. This significantly reduces the typically high costs associated with debugging binary program files.

Referring next to FIGS. 2–7, the function of one embodiment of the front end decompiler 14 will be described. Generally, decompiler 14 decompiles binary program file 10 and translates binary program file 10 into intermediate, machine independent file 16. As will be described in more detail, intermediate file 16 includes information identifying the function flow paths and structure of binary program file 10, the number of arguments or parameters associated with each function, and the return type for each of the functions. The information identifying the function flow paths and structure of the binary program file includes information identifying each function flow branch of the binary program file along with which function is associated with the end of each function flow branch and how that branch is interconnected with other function flow paths or branches.

Figure 2:
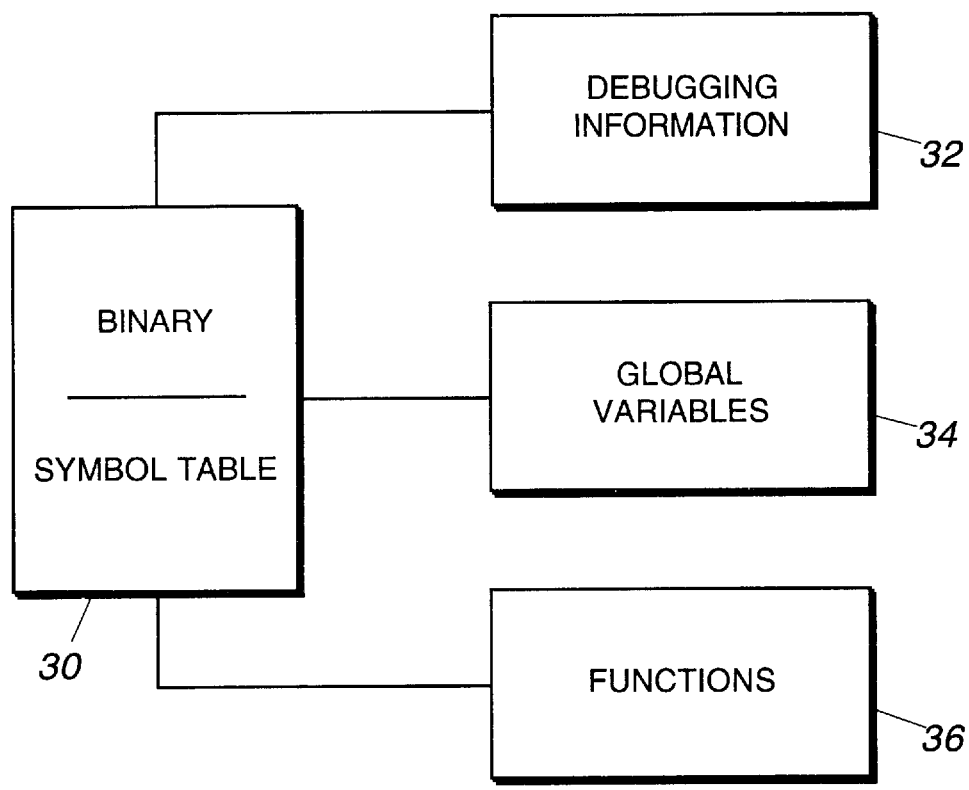
FIG. 2 is block representation of a binary program file with its debugging information, global variables, and functions extracted.

Referring initially to FIG. 2 and as would be understood by those skilled in the art, the binary program file 10 provided to the front end decompiler will include binary code and a symbol table 30. The symbol table 30 optionally includes debugging information 32, the global variables 34, and the function names 36. The function names 36 include pointers to the binary code associated with the respective function names. As will be appreciated by those skilled in the art, the actual mechanisms used to retrieve debugging information 32, global variables 34, and function names 36 will depend heavily upon the operating system used and the tools made available to that operating system. By way of example, when the Solaris® operating system is used, the ELF access routines may be used to retrieve this information. In other operating systems, roughly comparable access routines may be used to retrieve the necessary information.

Figure 3:
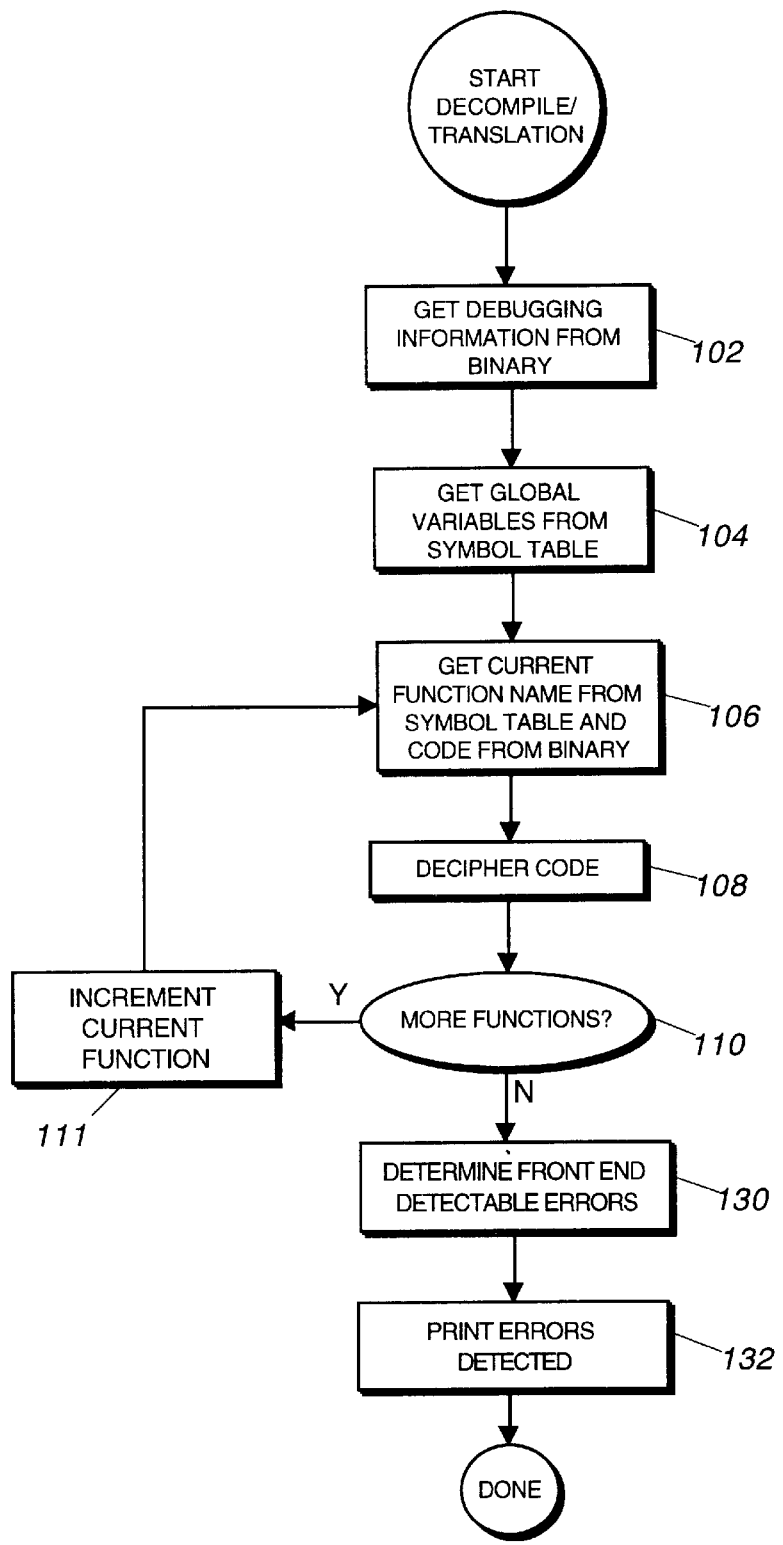
FIG. 3 is a flow diagram illustrating the function of a front end decompiler in accordance with one embodiment of the present invention.

Referring now to FIG. 3, when the front end 14 receives an input binary file 10 for a translation, it initially retrieves any debugging information 32 from the binary code in step 102. After the debugging information has been retrieved in step 102, the global variables 34 are retrieved from the symbol table in step 104. Thereafter,, the function name for the next function to be analyzed will be retrieved from function names 36 of the symbol table in step 106. Additionally, the code associated with the given function is also retrieved from the binary in step 106.

After the debugging information 32, global variables 34, and the current function have been retrieved from the input file in steps 102–106, decompiler 14 proceeds to step 108 where the code for the current function is deciphered. The code deciphering step 108 will be described in more detail below with reference to FIG. 4. Generally, step 108 disassembles, translates, and saves the current function into intermediate file 16. Step 108 also identifies the number of arguments, the return types, and the function flow relationships associated with the current function and saves this information in intermediate file 16. After the code for a particular function has been deciphered, determination is made in step 110 as to whether any more functions are to be deciphered at this time by decompiler 14. If a determination is made in step 110 that more functions are to be deciphered, the current function is incremented in step 111 and the logic returns to step 106 where the next function in the symbol table is retrieved as discussed above. The function retrieving and deciphering steps 106 and 108 are then repeated until all of the functions of binary program file 10 have been deciphered and saved in intermediate file 16.

Once all of the functions to be deciphered by the debugging tool have been processed, the determination will be made in step 110 of FIG. 3 that no more functions are to be deciphered. At that time, the logic proceeds to step 130 where front end detectable errors are identified and may optionally be printed in a step 132. Front end detectable errors may include errors such as mismatches in number or type of arguments or invalid return types. At this point, the intermediate code has been fully developed and may be passed to the back end analyzer 20 for further debugging.

Figure 4:
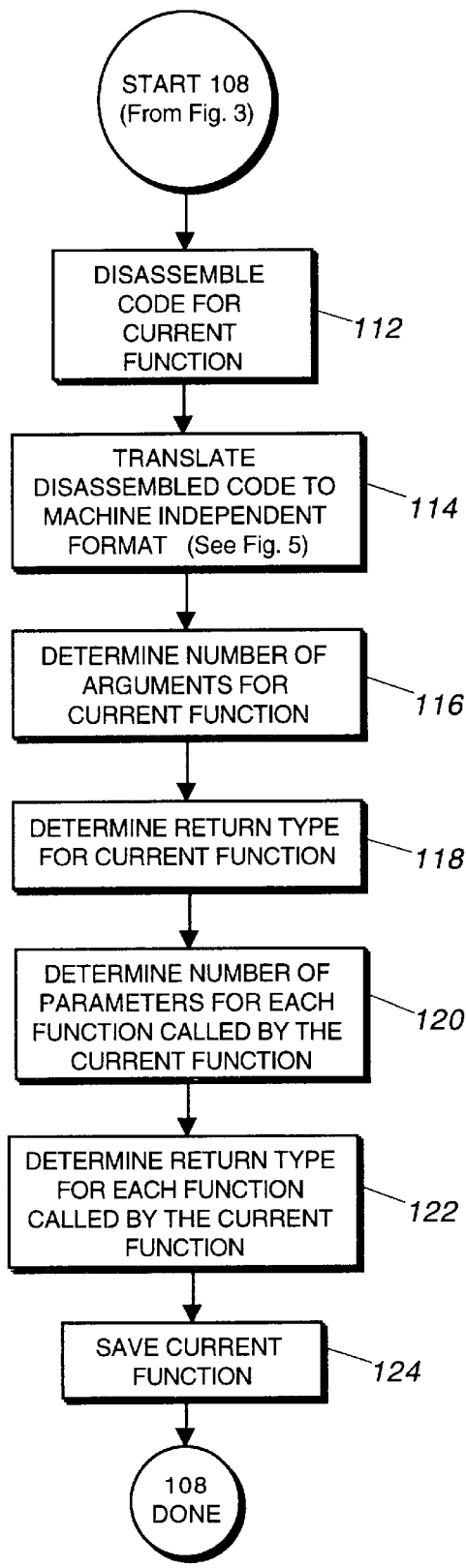
FIG. 4 is a flow diagram illustrating a method suitable for implementing the code deciphering step 108 of FIG. 3.

Referring next to FIG. 4, the code deciphering step 108 of FIG. 3 will be described in more detail. Initially, in step 112, the binary code for the current function is disassembled in a conventional manner as would be clear to those skilled in the art. Thereafter, in step 114, the disassembled code is translated to a machine-independent format. The details of this translating step 114 will be described in more detail below with reference to FIG. 5. Generally, this step identifies certain architecture-specific characteristics such as whether the current function is a leaf routine, whether the current function has an aggregate return, or whether the current function references a jump table. These characteristics complicate an otherwise relatively straight forward translation process.

Once the disassembled code has been translated into a machine-independent format, the logic proceeds to step 116 where a determination is made as to the number of arguments that are provided for the current function. An indication of the number of arguments for the current function is stored in intermediate file 16, and the logic proceeds to step 118 where a determination is made as to the return type of the current function. Again, an indication of the return type is stored in intermediate file 16, and the logic proceeds to step 120 where a determination is made as to the number of parameters that are provided for each function that is called by the current function. In essence, this identifies each additional function and/or recursive function call made by the current function and identifies the number of arguments provided in each such function call. An indication of the specific calls made as well as the number of parameters identified for each such call is then stored in intermediate file 116.

After the function call parameters have been identified in step 120, the logic proceeds to step 122 where the return type of each of the identified functions that are called by the current function is determined. Again, this information is saved in intermediate file 16. Thus, steps 116–122 are effectively arranged to mechanically identify the number of arguments and return types for the current function and any and all calls made by the current function. As will be described in more detail below with regard to back end analyzer 20, this information can be used to detect errors which occur in the specification of the argument and return types for the various function calls within the program.

After the above described features have been mechanically identified and saved, the disassembled and translated function is saved in step 124 as part of intermediate file 16. Once steps 112–124 have been finished, the logic proceeds to step 110 of FIG. 3 where a determination is made as to whether there are any additional functions which are to be disassembled. If so, as described above, the current function counter is incremented in step 111 and the logic returns to step 106 of FIG. 3 where the binary code for the next function is retrieved, and the process of overall deciphering step 108 (i.e. steps 112–124 of FIG. 4) are repeated for the new current function. This process continues until there are no more functions to be deciphered.

Figure 5:
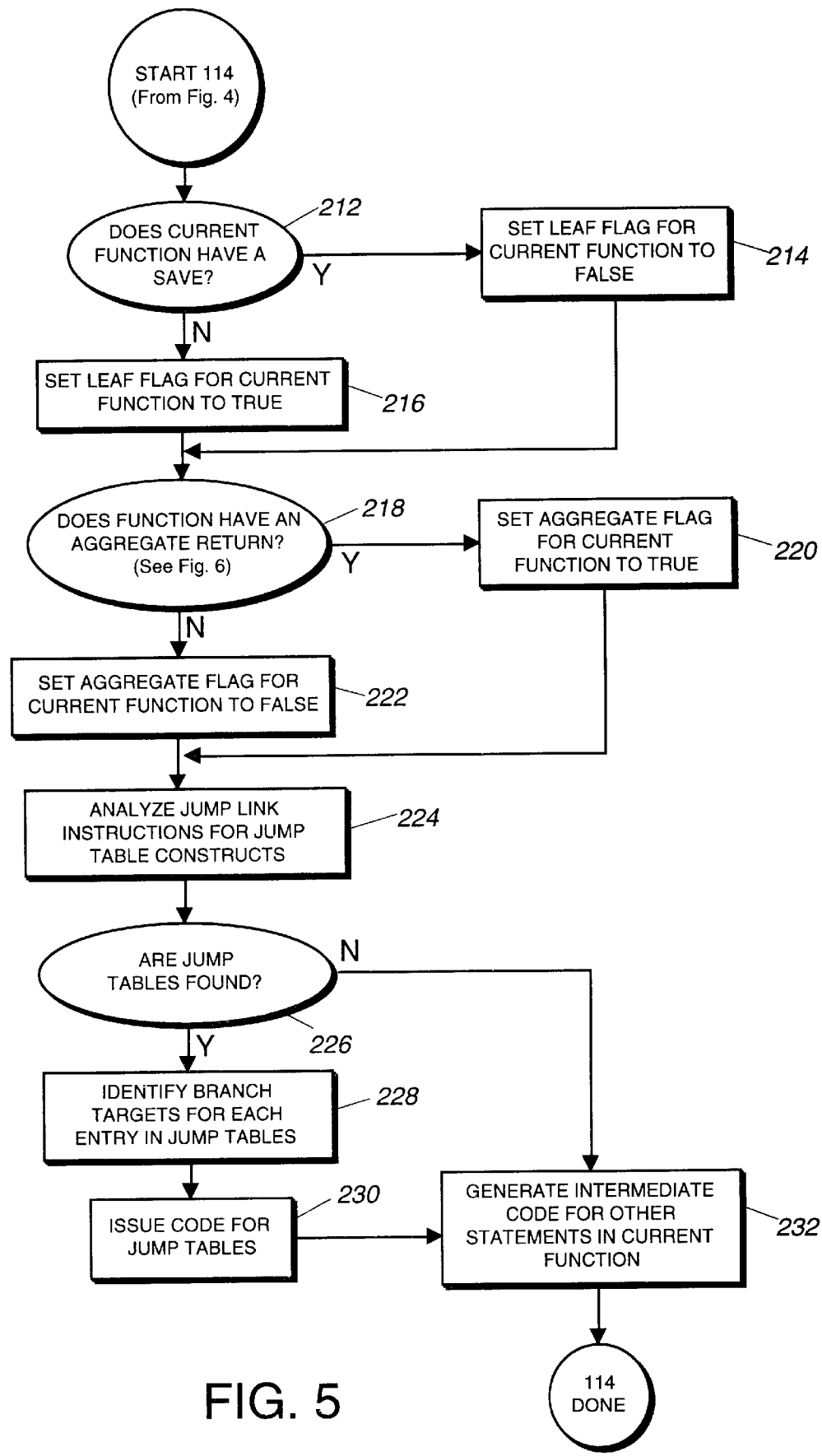
FIG. 5 is a flow diagram illustrating a method for implementing the disassembled code translating step 114 of FIG. 4.

Now that the overall deciphering step 108 has been described with reference to FIG. 4, the translating step 114 making up part of overall deciphering step 108 will be described in more detail. The details given here are for the SPARC architecture. The actual implementation will depend on the architecture and the procedure call convention being followed. Referring to FIG. 5, translating step 114 begins with step 212 in which a determination is made as to whether the current function has a "save" operation. If so, a leaf flag for the current function is set to 'false' in step 214 and saved in intermediate file 16. If not, the leaf flag for the current function is set to 'true' in step 216 and saved in intermediate file 16. The SPARC architecture specifies two different function definition protocols, which determine how local variables are accessed and where various information (such as return location) is stored. The leaf flag is a mechanism for determining which of these protocols is being followed in the current function. Regardless of which way the leaf flag is set in step 214 or 216, the logic proceeds to step 218.

Generally, step 218 determines whether or not the function has an aggregate return. The aggregate return determination of step 218 will be described in more detail below with reference to FIG. 6. However, as shown in FIG. 5, if it is determined that the function does include an aggregate return, then an aggregate flag associated with the current function is set to 'true' in step 220 and saved in intermediate file 16. Alternatively, if the function does not have an aggregate return, the aggregate flag for the current function is set to 'false' in step 222 and saved in intermediate file 16. In a similar manner to that described above for the leaf flag, the aggregate return flag is a mechanism for identifying within intermediate file 16 whether or not the current function has an aggregate return. After the aggregate flag has been set in either step 220 or step 222, the logic proceeds to step 224.

In step 224, the current function is checked for any jump link instructions and the jump link instructions for the current function are analyzed to determine whether any jump tables exist. On the SPARC architecture, a JMPL (jump link) instruction may be used for a function return statement, an indirect function call, or a jump to a location loaded from a jump table. Therefore, if the jump link instructions are not an indirect procedure call or a return, then they are a jump, and a jump will have an associated jump table. Jump tables may contain a set of branch targets for the jump link instruction. Generally, steps 226–230 identify each of these possible function flow paths contained in any jump tables and issue code for intermediate file 16 which corresponds to and represents each of the possible function flow paths dictated by the jump tables. If any jump tables are found in step 226, branch targets are identified for each branch entry in the jump tables in step 228. The branch target identifying step 228 will be described in more detail below with reference to FIG. 7. Once the branch targets have been identified in step 228, step 230 issues code for intermediate file 16 which corresponds to and represents each of the various function flow paths and includes the branch target information identified in the jump tables. Alternatively, if no jump table is found in step 226, or, after code has been issued for the jump tables in step 230, the logic proceeds to step 232 where additional code for intermediate file 16 is generated that corresponds to and represents the other statements not associated with jump tables. These other statements include memory loads/stores, arithmetic operations, procedure calls, returns, etc.

Figure 6:
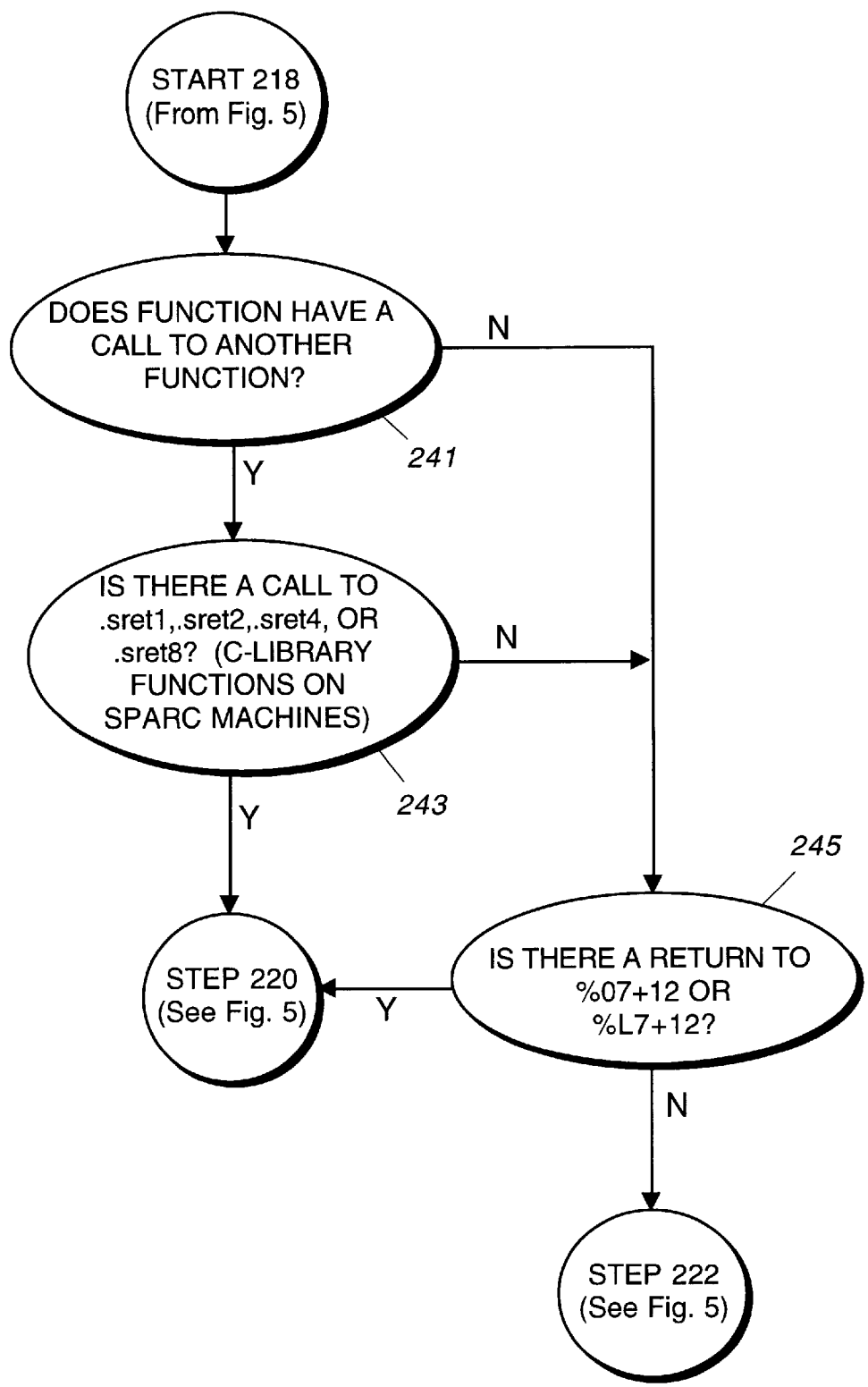
FIG. 6 is a flow diagram illustrating a method for implementing the aggregate return checking step 218 of FIG. 5.

Now that steps 212–232 of FIG. 5 (i.e. the steps which make up translating step 114 of FIG. 4) have been described, aggregate return determination step 218 and branch target identifying step 228 of FIG. 5 will be described in more detail. Referring initially to FIG. 6, aggregate return determination step 218 will be described in more detail by using a specific example of a program written in C programming language on a SPARC machine. Other machines using other program languages would require different specific determinations to identify whether the current function has an aggregate return. These other determinations should be clear to those skilled in the art in view of this description and therefore will not be described in detail.

As shown in FIG. 6, initially, determination is made as to whether the current function has a call to another function in step 241. If there is a call to another function, step 243 determines if there is a call to .sret1, .sret2, .sret4, or .sret8. Generally, this step determines if there is a call to a known function for returning an aggregate. If the answer is yes, the logic proceeds to step 220 of FIG. 5. If in step 241, the current function does not call another function, or if in step 243 there is not a call to .sret1, .sret2, .sret4, or .sret8, then the logic proceeds to step 245 which determines if there is a return to %O7+12 or %L7+12. Generally, this step determines if the current function returns an aggregate itself. If so, the aggregate flag for the current function is set to true in step 220 of FIG. 5 and, if not, control is passed to step 222 of FIG. 5 which sets the aggregate flag for the current function to false.

Figure 7:
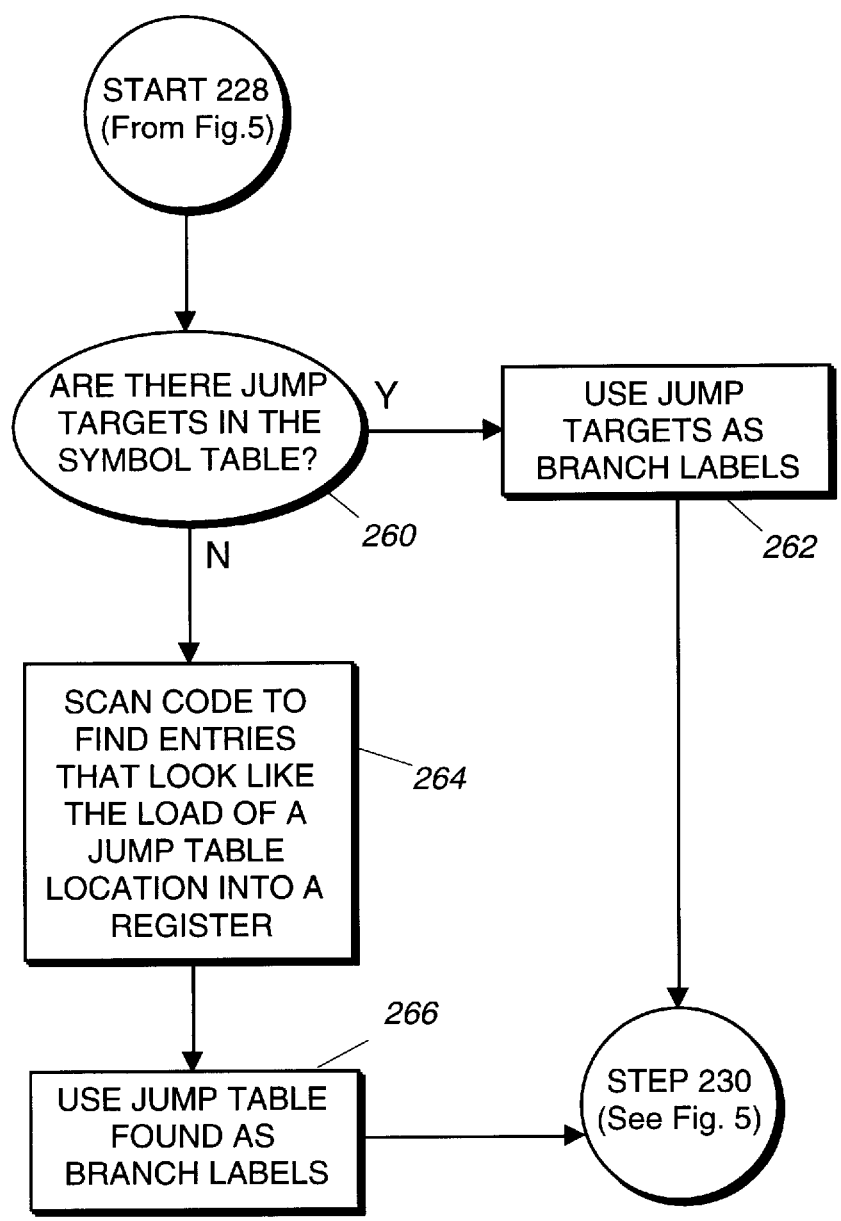
FIG. 7 is a flow diagram illustrating a method for implementing the branch target inserting step 228 of FIG. 5.

Referring now to FIG. 7, branch target identifying step 228 will be described in more detail. Initially, in step 260, determination is made as to whether there are jump targets in the symbol table which was found in step 226 of FIG. 5. If so, the jump targets are used as the branch labels in step 262 in order to keep track of the function flow which corresponds to each of the possible function flows contained within the jump table. These branch labels are used in step 230 of FIG. 5 to issue code to intermediate file 16 which corresponds to and represents each of the various function flow paths contained within the jump table. Although the use of the branch labels from the symbol table is very robust, it will indicate potential paths from the jump link instruction to all branch destinations in the function regardless of whether those destinations were in the actual jump table. In an optimized version of the debugging tool, the invalid paths may be detected and eliminated using the back end analyzer.

Alternatively, if step 260 determines that there are not jump targets in the symbol table, the code of the current function is scanned to find entries that look like the load of a jump table location into a register in step 264. When what looks like a jump table location is found within a register, step 266 uses the jump targets of the jump table at that found location as the branch labels and the logic proceeds to step 230 of FIG. 5. In this case, the branch labels from step 266 are used to issue the code for intermediate file 16 in step 230. The analysis of the code to determine the jump table location and potential branch targets is more accurate than extracting the branch labels from the symbol table. Using this approach, the indicated paths should be valid paths. However, this approach requires fairly sophisticated analysis, and requires the analyzer to be able to recognize all potential jump table code sequences that the target compilers may issue.

Once the process described above and illustrated in FIGS. 2–7 has been completed, intermediate file 16 contains a complete representation of the entire binary program file 10 which includes code representing each of the functions making up the file and all of the possible flow paths associated with each of the functions (i.e. calls, jump tables, etc.). As described above, intermediate file 16 also contains information such as the number and type of parameters and the return type for every function definition and function call of binary program file 10. Intermediate file 16 further contains information extracted from the debugging information 32 such as variable names and types along with locations, line numbers, and source file information for the various functions.

As will be described in more detail below, because intermediate file 16 includes all of the flow path information along with detailed information about each of the functions within binary program file 10, back end analyzer 20 is able to walk through all of the various program flow paths in the representation of binary program file 10 and search for a variety of different types of errors. Several program errors which have proved to be extremely difficult to detect using conventional debugging tools may be readily detected using this novel static debugging approach. For example, errors such as uninitialized memory, array bounds violations, accesses outside of allocated memory, inconsistent argument types or returns between calls and called functions, and functions that are not consistent in their returns or that do not return may all be readily detected using the inventive static debugging tool. Furthermore, this approach may be used to detect a wide variety of other program errors such as invalid references to automatic memory (either through function returns or by assignments to globals which are referenced after the owning function has returned), accessing freed memory, and frees of non-allocated memory.

Generally, for each type of error, the analyzer detects the errors by tracking the types and uses of various program parameters while following all of the possible flow paths of the representation of the binary program fie and checking for any inconsistent use of the various program parameters throughout the representation of the binary program file. As mentioned above and in accordance with the present invention, this is all done without having to execute the binary program file. Therefore, there is no need to develop expensive test suites in order to exercise the binary program file for the purpose of detecting program errors.

Referring next to FIGS. 8–10b, the function of one embodiment of the back end analyzer 20 will be described in detail using some particular examples of types of errors that may be detected. As will be clear to those skilled in the art in view of this description, the general approach of the present invention may be applied to detecting a wide variety of types of program errors. Therefore, it should be understood that the invention is not limited to the specific examples given but would equally apply to a wide variety of embodiments regardless of the specific type of error being detected.

Figure 8:
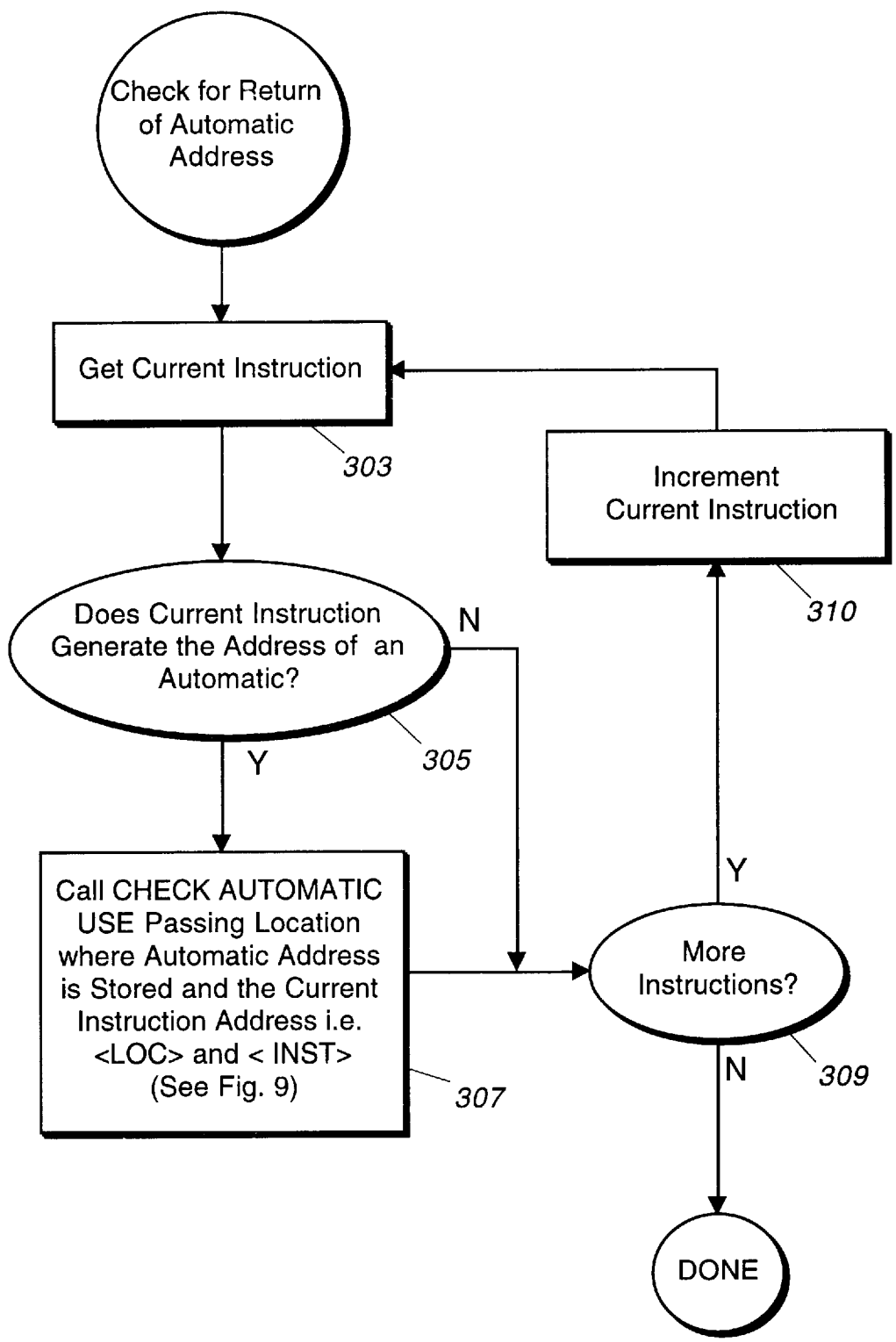
FIG. 8 is a flow diagram illustrating one of the functions of a back end analyzer in accordance with another embodiment of the present invention which checks for the return of an automatic address.

In a first example of program errors that may be detected using the novel debugging tool, the back end analyzer 20 is arranged to check for the potential return of an automatic address as illustrated in FIG. 8. Initially, analyzer 20 gets a current instruction of the representation of the binary program file 10 from intermediate file 16 in step 303. In step 305, a determination is made as to whether the current instruction generates the address of an automatic. If so, step 307 calls CHECK AUTOMATIC USE which will be described in more detail with reference to FIG. 9. Step 307 includes two arguments or parameters used by CHECK AUTOMATIC USE. In this example, the first parameter is the address of the location in which the automatic is stored (i.e. <LOC>) and the second parameter is the address of the current instruction (i.e. <INST>).

Once the call to CHECK AUTOMATIC USE is complete, or, if in step 305 it is determined that the current instruction does not generate the address of an automatic, the logic passes to step 309 which determines whether there are more instructions to be analyzed. This step simply checks to see if there are any more instructions to be analyzed regardless of the function flow associated with the instructions. If there are more instructions, the current instruction is incremented in step 310 and analyzer 20 gets a next current instruction in step 303. Steps 303–310 are repeated until there are no more instructions to be checked for the return of an automatic address. When there are no more instructions to be checked, the overall process of checking for the potential return of an automatic address is done. Thus, this automatic address checking routine searches through intermediate file 16 and detects errors or inconsistencies in the return of an automatic address.

Figure 9:
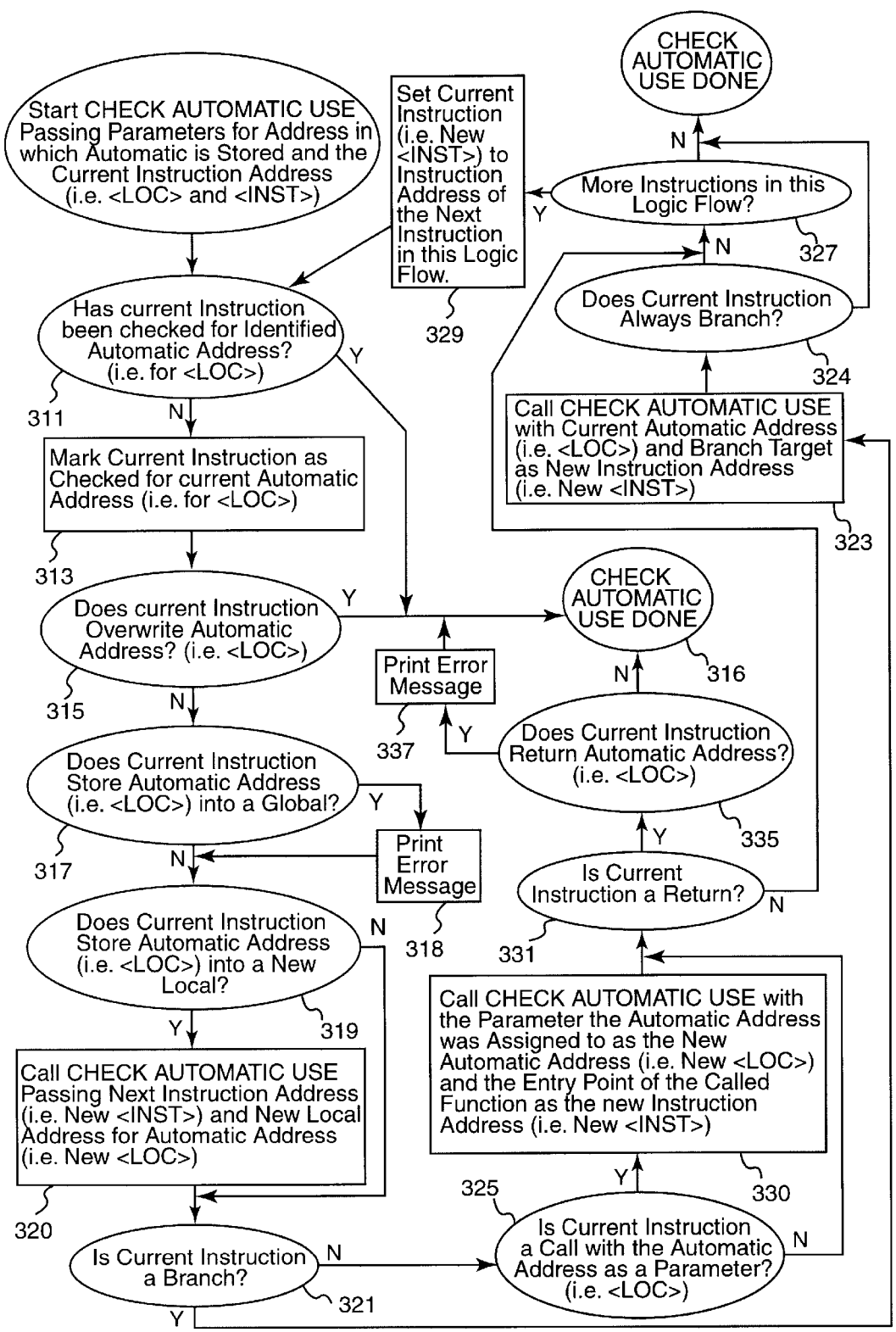
FIG. 9 is a flow diagram illustrating a method for implementing the check automatic use step 307 of FIG. 8.

Referring to FIG. 9, the process of checking the automatic use will be described in more detail. Initially, in step 311, determination is made as to whether the current instruction has been checked already for the current automatic address. As mentioned above, the current automatic address which is being checked is passed to CHECK AUTOMATIC USE as a parameter (i.e. the parameter <LOC>). If the current instruction has been checked for the identified or current automatic address, the automatic use checking process is finished. If the current instruction has not been checked for the current automatic address, the current instruction is marked as checked for the current automatic address (i.e. for <LOC>) in step 313.

In step 315, a determination is made whether the current instruction overwrites the current automatic address. If so, the automatic use checking process is done as indicated in step 316 of FIG. 9 since the address cannot be propagated by this instruction. If the current instruction does not overwrite the current automatic address, the process continues in step 317 where the determination is made whether the current instruction stores the current automatic address into a global. If so, an error message is generated in step 318 since this is not an appropriate use of an automatic address and the process moves on to step 319. If the current instruction does not store the current automatic address into a global, the checking process moves directly to step 319.

In step 319, it is determined whether the current instruction stores the current automatic address into a new local. If this is the case, CHECK AUTOMATIC USE is recursively called in step 320 passing the address of the new local at which the automatic address is stored as the first parameter and the next instruction address as the second parameter. During this step, the entire overall automatic use checking process currently being described is performed using the new parameters (i.e. the address of the new local in which the automatic is stored and the next instruction address). Once this recursive call to CHECK AUTOMATIC USE is finished, the process continues to step 321. On the other hand, if in step 319, the current instruction does not store the current automatic address into a new local, the process moves directly to step 321.

Step 321 determines whether or not the current instruction is a branch instruction. If the current instruction is not a branch instruction, the process goes directly to step 325 and the automatic use checking process continues. This portion of the process will be described after the process associated with determining in step 321 that the current instruction is a branch has been described.

As shown in FIG. 9, if the current instruction is a branch instruction, CHECK AUTOMATIC USE is again recursively called with the current automatic address and a new instruction address as parameters in step 323. In this case, the recursive call to CHECK AUTOMATIC USE passes the current automatic address (the same automatic address used in the original call) as the first parameter. However, the address of the branch target is used as the second parameter for the instruction address rather than the current instruction address (i.e. the branch target is used for the new instruction address <INST>). As mentioned above, the entire overall checking process currently being described for CHECK AUTOMATIC USE is performed in step 323 using the new parameters. Once this recursive call is complete, the logic moves to step 324 which determines whether the branch for the current instruction is always taken. If so, the overall automatic use checking process is done.

If the branch for the current instruction is not always taken, the process continues from step 324 to step 327 which determines if there are more instructions in the current logic flow of the instructions. This step is different than step 309 of FIG. 8. In this step, the analyzer actually follows the function flow of the instructions and determines if there are any more instructions associated with the current logic flow path of the instructions. If there are not any more instructions the overall automatic use checking process is done. However if there are more instructions, the current instruction parameter (i.e. <INST>) is set to the address of the next instruction in the logic flow path in step 329 and the process moves on to step 311.

The flow of steps 327 and 329 form a loop within the overall automatic use checking process by directing the process back to step 311. This allows the process to follow the logic flow path of the instructions throughout a particular logic flow path of the instructions for a specific automatic address (i.e. <LOC>). This loop continues until the process reaches the end of the particular logic flow path of the instructions.

Now that the process associated with determining in step 321 that the current instruction is a branch has been described above, the process associated with determining in step 321 that the current instruction is not a branch will be described. As mentioned above, if the current instruction is not a branch the process moves to step 325. Step 325 determines if the current instruction is a call with the current automatic address as a parameter. If it is a call with the current automatic address as a parameter, CHECK AUTOMATIC USE is again recursively called in step 330. This time, a new first parameter is passed with the call to CHECK AUTOMATIC USE which contains the new location to which the automatic address was assigned in the call (i.e. a new <LOC>). Also, a new instruction address is passed as the second parameter which contains the entry point of the function which is called by the current instruction (i.e. a new <INST>). Once this entire recursive call to CHECK AUTOMATIC USE is finished the original automatic use checking process moves on to step 331 as is also the case if call determining step 325 determines the current instruction is not a call.

Step 331 determines whether or not the current instruction is a return. If it is not a return, the process moves to step 327 to determine if there are any more instructions in the current logic flow of the instructions. As described above, if there are not any more instructions the overall automatic use checking process is done. However, if there are more instructions, the current instruction parameter (i.e. <INST>) is set to the address of the next instruction in the logic flow path in step 329 and the process moves on to step 311. Again, steps 327 and 329 form a loop within overall automatic use checking process. As described above, this loop allows the process to follow a particular logic flow path of the instructions checking these instructions for the potential return of a specific automatic address (i.e. <LOC>).

If step 331 determines that the current instruction is a return, the process moves to step 335. Step 335 determines whether the current instruction returns the current automatic address. If it does not return the automatic address, the overall automatic use checking process is done. However, if the current instruction does return the automatic address, the logic moves to step 337 which generates an error message and then the overall automatic use checking process is done.

Using the above described process illustrated in FIGS. 8 and 9 to check the binary program file for the consistent return of an automatic, analyzer 20 checks each instruction of the binary program file for the generation of the address of an automatic. If one is found, analyzer 20 follows each of the possible flow paths of that instruction recursively calling CHECK AUTOMATIC USE for any subsequent instructions of each possible flow path associated with that instruction. This process continues until every instruction and every associated flow path of the binary program file is checked. This same basic approach may be used to detect a wide variety of other types of program errors.

Figure 10A:
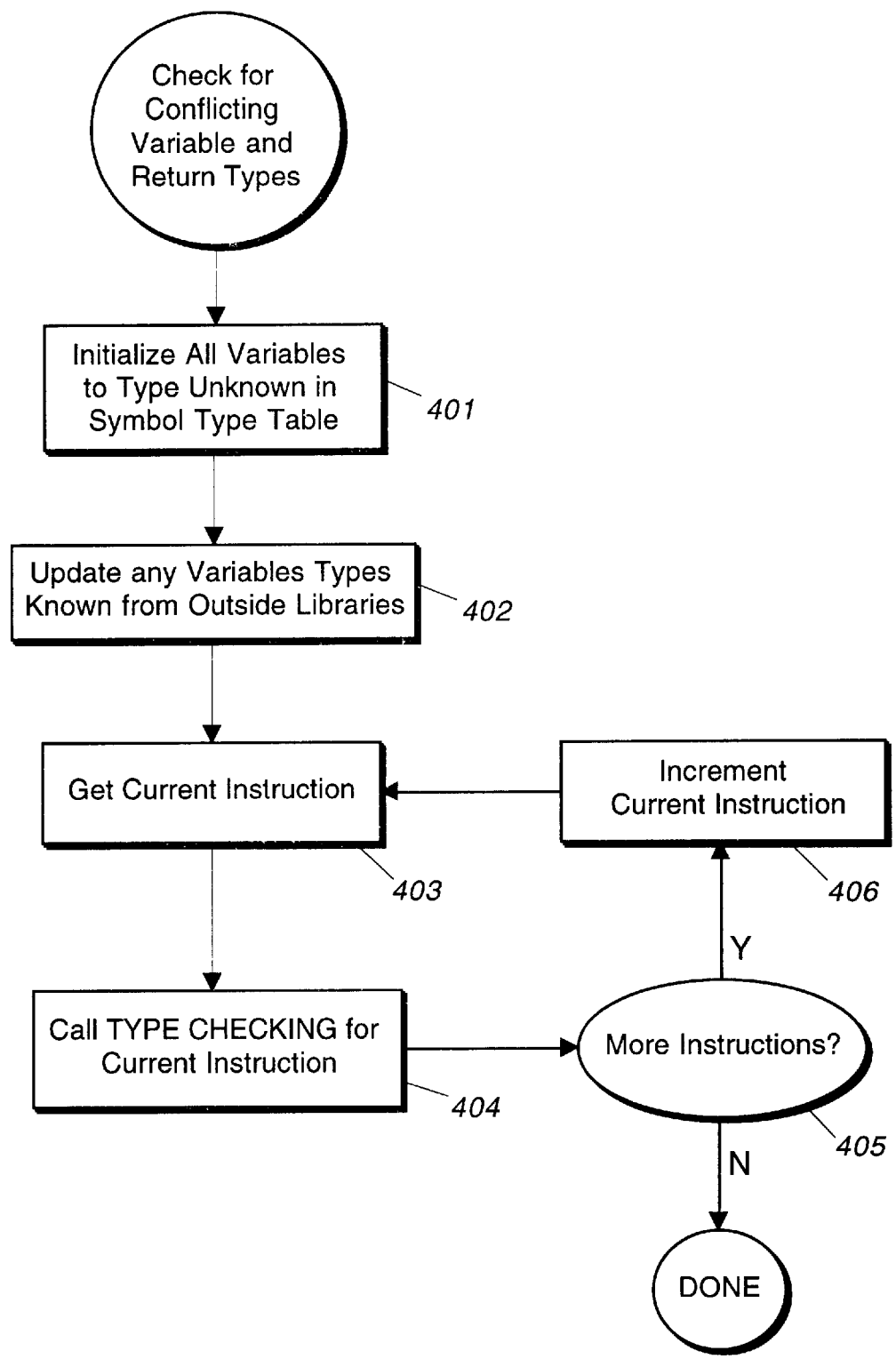
FIG. 10a is a flow diagram illustrating a method for initializing a symbol type table for use in the type checking method of FIG. 10b.
Figure 10B:
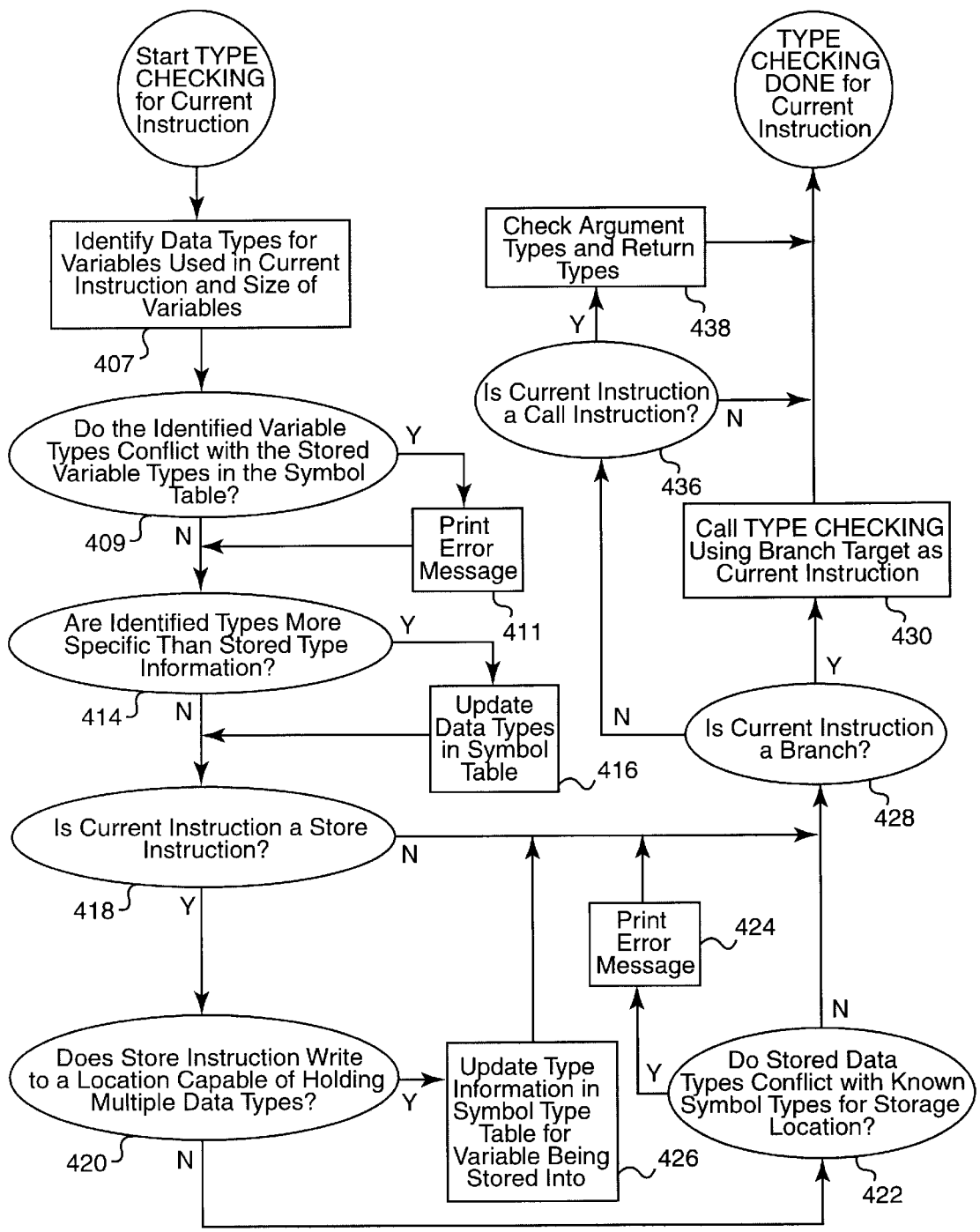
FIG. 10b is a flow diagram illustrating another one of the functions of a back end analyzer in accordance with another embodiment of the present invention which checks for consistent use of argument and return value types.

In a second specific example illustrated in FIGS. 10a and 10b, analyzer 20 is used to check the consistent use of variable types throughout the program. Referring initially to FIG. 10a, a symbol type table is used to track the types of all of the variables or arguments that are used in the binary program file. In step 401, all of the variables or arguments are initialized to an unknown type in the symbol table. In situations where there is information available about the variables or arguments from an outside source, such as hint file 12 or system call and restriction(s) library(s) 18 or symbolic debugging information 32, this information is used in step 402 to initialize the appropriate variables or arguments to their known type in the symbol type table. The overall type checking process continues with step 403 which gets a current instruction from intermediate file 16 and the process moves on to step 404. Step 404 calls a routine called TYPE CHECKING which will be described in more detail with reference to FIG. 10b. Generally, this step checks for conflicting variable and return types.

Once the call to TYPE CHECKING is complete for the current instruction, the logic moves to step 405 which determines whether there are more instructions to be analyzed. If there are more instructions, the current instruction is incremented in step 406 and analyzer 20 gets a next current instruction in step 403. Steps 403–406 are repeated until there are no more instructions to be checked for the conflicting variable and return types. When there are no more instructions to be checked, the overall process of checking for conflicting variable and return types is done. Thus, this overall process searches through intermediate file 16 and detects errors or conflicting variable and return types.

Referring now to FIG. 10b, the TYPE CHECKING routine called by the overall process of checking for conflicting variable and return types in the binary program file will be described in detail. Initially, step 407 identifies the data types for the variables used in the current instruction and the size of the variables. Next, step 409 determines if any of the identified variable types conflict with the stored variable types in the symbol type table. If conflicts are found, an error message is generated in step 411 and the process continues to step 414. If there are no conflicts detected in step 409, the type checking process moves directly to step 414. Step 414 determines if the identified types are more specific than the types currently stored in the symbol type table. If they are more specific, the variable types are updated in the symbol type table to reflect the more specific type in step 416 and the process moves on to step 418. If none of the types are more specific, the type checking process moves directly from step 414 to step 418.

As shown in FIG. 10b, step 418 determines whether the current instruction is a store instruction. If it is not a store instruction the process goes directly to step 428. However, if the current instruction is a store instruction, the logic moves to step 420 which determines whether the store instruction writes to a location capable of holding multiple data types. If the location is capable of holding multiple data types, the type information for the variable being stored into is updated in the symbol type table and the process continues to step 428. Alternatively, if the location is not capable of holding multiple data types, the process moves to step 422 which determines whether the data types of the variables being stored conflict with the known types in the symbol type table for the storage locations of the variables being stored. If there is no conflict in step 422, the process moves to step 428. However, if there is a conflict detected in step 422, an error message is generated in step 424 and then the process goes on to step 428.

At this point each of the process paths described above have lead to step 428 which determines if the current, instruction is a branch instruction. If it is a branch instruction, the type checking process currently being described is called recursively using the branch target of the branch instruction as the current instruction in step 430. This recursive call to TYPE CHECKING checks the variable and return types for the instruction that the branch instruction called by following steps 407–438 of the type checking process as is currently being described. Once the overall type checking process recursively called in step 430 is finished, the type checking process for the current instruction is done.

Step 436 determines whether the current instruction is a call instruction. If it is not a call instruction, the type checking process is done for the current instruction. However, if the current instruction is a call instruction, the logic moves to step 438 which checks the argument types and return types of the call instruction. Once the argument types and return types are checked for conflicts, the type checking process for the current instruction is done.

Using the above described process illustrated in FIGS. 10a and 10b, analyzer 20 checks for conflicting variable and return types by tracking the variable and return types while searching through the entire intermediate file 16 which is a complete representation of the binary program file 10. Analyzer 20 follows each of the possible flow paths of the program file repeatedly calling TYPE CHECKING for each instruction of each possible flow path associated with that instruction. In a similar manner to that described above for the automatic use checking process, this process walks through the entire representation of the program file and continues type checking until every instruction and every associated flow path of the binary program file is checked. As mentioned above, this same basic approach may be used to detect a wide variety of other types of program errors.

In one preferred embodiment of the invention, various statements and/or arguments within a function associated with the binary program file may be symbolically represented using binary decision diagrams (BDDs) or other symbolic representations. Conceptually, BDDs can be used to symbolically represent any arithmetic operation (addition, multiplication, division, etc.). BDDs may also be used to represent the state of any bit in the memory as the analyzer walks through the representation of the program file. In practice, BDDs grow too quickly in size and complexity to be used very effectively in this broad manner. Therefore, in a presently preferred embodiment, BDDs are only used to keep track of a small set of values.

As will be appreciated by those skilled in the art in view of this disclosure, binary decision diagrams may be used to represent a wide variety of operations and/or values. Many references are available which describe various uses of BDDs. These references include the following: an article by S. B. Akers entitled *Binary decision diagram* published in IEEE TRANSACTIONS ON COMPUTERS, Vol. C-27, No. 6, pp. 509–516, June 1978; an article by R. E. Bryant entitled *Graph-Based Algorithms for Boolean Function Manipulation* published in IEEE TRANSACTIONS ON COMPUTERS, Vol. C-35, No. 8, pp. 677–691, August 1986; a presentation by K. S. Brace, R. L. Rudell, and R. E. Bryant entitled *Efficient Implementation of a BDD Package* published in the PROCEEDINGS OF THE 27th ACM/IEEE DESIGN AUTOMATION CONFERENCE, June 1990; and a book written by S. Minato entitled BINARY DECISION DIAGRAMS AND APPLICATIONS FOR VLSI CAD, Kluwer Academic Publishers, 1996. Each of these references is incorporated herein by reference.

One use of BDDs that is particularly useful is to use BDDs to track the values of expressions that are used to control the flow through the various functions of the program file. For example, for a given function flow, BDDs may be used to symbolically represent the conditions required in order to reach any particular point within that given function flow. An example of this will be described with reference to FIG. 11 which diagrammatically illustrates a function flow fragment 500 of a given function.

Figure 11:
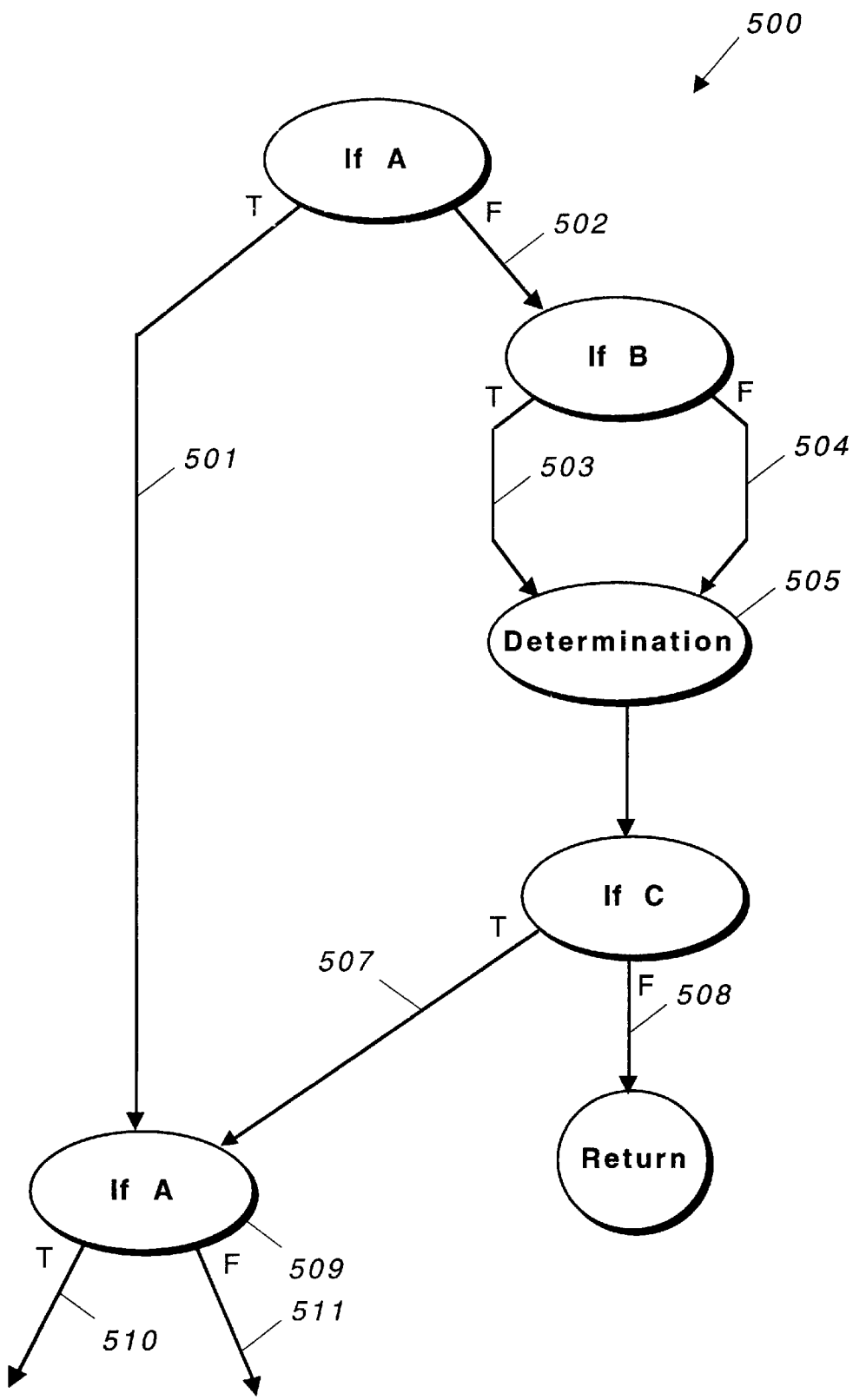
FIG. 11 is a flow diagram illustrating the flow of a fragment of a function in which the values of the expressions that are used to control the flow of the function are tracked in accordance with the present invention using binary decision diagrams.

As shown in FIG. 11, the function follows a particular function flow path. For this fragment, if the initial condition A is true, the flow proceeds down leg 501 to node 509. If condition A is false, the flow moves down leg 502 to condition B. If condition A is false and condition B is true, flow proceeds down leg 503 which leads to node 505. If both condition A and condition B are false, the flow moves down leg 504 which also leads to node 505. From node 505, the flow proceeds to condition C, which, if false, causes the flow to move down leg 508 to a return. Alternatively if condition C is true, the flow proceeds down leg 507 to node 509 which repeats an additional condition A. If this last condition A is true the flow follows leg 510. However, if the last condition A is false, the flow proceeds down leg 511.

At any point within a function, a BDD that describes under which conditions that particular point may be reached may be computed. In the simple fragment illustrated in FIG. 11, it is assumed that at the top of the fragment, the current constraint is TRUE (i.e. the illustrated fragment is always executed). At the first branch point, a BDD representing condition A can be computed. If the expression for condition A is simple enough, a BDD representing that expression is computed. Otherwise, a new BDD variable is created and used to represent condition A.

For the code that follows path 501 from condition A to node 509, the constraint will be the logical AND of the current constraint which directed the flow to the first condition A and the BDD for condition A (call this A.bdd). For code along path 502 from the first condition A to condition B, the constraint will be the logical AND of the current constraint which directed flow to the first condition A and the logical NOT of the BDD for condition A (i.e. NOT(A.bdd)). Similarly, the constrain for path 503 which is associated with condition B being true will be (NOT(A.bdd) AND B.bdd) and the constraint for path 504 will be (NOT(A.bdd) AND NOT(B.bdd)).

Since node 505 can be reached from different paths, the constraint for node 505 is calculated by taking the union of each of the possible paths to node 505 (i.e. both paths 503 and 504). In this example, this would correspond to the constraint (NOT(A.bdd) AND B.bdd) OR (NOT (A.bdd) AND NOT(B.bdd)) which is the same as the constraint NOT (A.bdd). Continuing in the same manner along the flow, the constraint on path 507 is (NOT(A.bdd) AND C.bdd) and the constraint at node 509 is the union of the constraints along paths 501 and 507, both of which lead to node 509. In this case the constraint for node 509 is (A.bdd [from path 501]

OR (NOT(A.bdd) AND C.bdd) [from path 507]). This constraint is equivalent to (A.bdd OR C.bdd).

Assuming that none of the variables used to evaluate condition A were changed in any of the paths from the first condition A to the last condition A in node 509, then the BDD representing the last condition A will be the same as the BDD representing the first condition A (i.e. A.bdd). Therefore the constraint for path 510 will be ((A.bdd OR C.bdd) AND A.bdd) which is equivalent to (A.bdd). And finally, the constraint for path 511 will be ((A.bdd OR C.bdd) AND NOT(A.bdd)) which is equivalent to (C.bdd AND NOT(A.bdd)).

Using the above described approach, each memory location being tracked can be associated with a list of values and conditions under which those values are valid. For example, if a variable "x" has the value "3" going into the above described flow fragment, was assigned the value "4" along path 501 leading to node 509, and was assigned the value "5" along path 504 to node 505, its values at node 509 would be in the list {("4" if (A.bdd)), ("5" if (NOT(A.bdd) AND NOT(B.bdd))), ("3" if (NOT(A.bdd) AND B.bdd))}. If along path 501 there was a reference to variable "x", the current constraint (i. e. (A.bdd)) to the list of potential values for "x" would indicate that the only value "x" could take on would be "4". Similarly, to determine the potential values for "x" along path 511, the constraint for path 511 (i. e. (C.bdd AND NOT (A.bdd))) is compared to the conditions list of values for "x". This would determine that "x" could take the values "3" and "5". BDDs are a useful representation for this type of constraint checking, since the operations performed (logical AND, logical NOT, logical OR) can be performed relatively quickly.

One of the places BDDs are used in a preferred embodiment of the invention is in the jump table deciphering stage of the front end. In this case, when a JUMP instruction (in the SPARC architecture) is found, the location and size of the jump table that the JUMP instruction is branching from needs to be determined. One way of doing this is to create a jump expression describing the jump target and a constraint expression describing when the jump target is valid.

Initially, the jump expression is the target of the JUMP instruction, and the constraint expression is TRUE. The tactic is to trace backwards through the instruction flow until enough is learned to make a reasonable guess as to the size and location of the jump table. Every time an instruction is encountered that modifies a location that is loaded by either the jump expression or the constraint expression, the load(s) in those expressions are replaced by the changed value. Every time a branch away from the instruction sequence leading to the JUMP is encountered, the constraint expression is replaced with the logical AND of the constraint expression and the complement of the branch condition. Every time that either the constraint expression or the jump expression is changed, the range of the jump expression is checked given that the constraint expression is true. The BDDs are used to do the range evaluation.

Although only a few examples of how BDDs may be used in accordance with the invention have been described, it should be clear to those skilled in the art in view of this disclosure that BDDs may be used in a similar fashion to aid in the analysis of the binary file to detect a wide variety of other types of errors. Also, although the above described approach of tracking the values of variables through the function flow has been described in conjunction with the use of BDDs, it should be understood that this general approach of tracking the values of certain variables, or tracking the relationship between different variables, may be used to help detect a wide variety of errors or potential errors with or without the use of BDDs.

One type of error of that may be detected using this approach is detecting code or loops which are never executed. By tracking the possible values of a particular variable which is used to control the function flow in a condition statement such as a loop, case, or if statement, the analyzer is able to determine whether or not all of the various possible flow paths through the condition statement actually are able to be executed based on the possible values of the variable which controls the function flow. In a specific example, assume that the variable "i" is used in an "If" statement that directs the function flow to particular code when "i" is equal to "1". By tracking the possible values for "i" throughout the function flow of the program as described above, the analyzer would be able to determine whether or not "i" is able to have the value of "1". If the analyzer determines that "i" is never able to have the value "1", the analyzer would generate an error message indicating that the portion of the code associated with the condition of "i" equaling "1" is dead code that will never be executed.

As should be clear to those skilled in the art, the above described general approach to tracking variables and relationships between variables may also be used to detect many other types of errors. Using this general technique, cases where variables may be used before they were initialized or assigned a value and cases of redundant comparisons or assignments may be detected. These are not necessarily errors, but they may indicate typographic errors or poor compilers. This technique can also yield range information that can be used to validate array accesses or argument restrictions on some functions. Other types of errors that may be detected using this approach include, but are not limited to, function parameters that are out of bounds, memory access errors, and potential invalid operands for arithmetic operations such as dividing by zero. The present invention equally applies to all of these various types of error detecting so long as the values of the variables are tracked as the analyzer statically searches through the program file or symbolically executes a symbolic representation of the program file. As should be understood by those skilled in the art, many of these types of errors are very difficult, if not impossible, to detect using the conventional approach of debugging a program by using test suites which actually execute the program being debugged.

As mentioned above, although only a few specific examples of types of errors that may be detected using back end analyzer 20 have been described in detail, it should be understood that a wide variety of different types of errors may be detected using a general approach similar to that described in the specific examples. Furthermore, although only one embodiment of the present invention has been described, it should be understood that the present invention may be embodied in many other specific forms without departing from the spirit or scope of the invention. For example, the debugging tool of the present invention may use a variety of different front end decompilers to decompile the binary program file depending on the specific requirements of a particular situation.

Although particular program languages and machines have been referred to in some of the examples, it should also be understood that the present invention would equally apply regardless of the particular program language and machine for which the binary program file is intended to be used. Using the novel techniques described above, those skilled in the art may readily apply these novel techniques to any specific binary program using a particular program language written for a particular machine and still remain within the spirit and scope of the present invention. Therefore, the present examples are to be considered as illustrative and not restrictive, and the invention is not to be limited to the details given herein, but may be modified within the scope of the appended claims.

What is claimed is:

1. A static debugging tool for use with a computer and for debugging a binary program file without requiring the execution of the binary program file in order to detect the presence of program errors and potential program errors, the static debugging tool comprising:

an analyzer for causing die computer to statically analyze a representation of the binary program file to detect the presence of program errors or potential program errors in the representation of the binary program file without executing the binary program file, wherein the representation of the binary program file is an intermediate file; and an output arrangement for causing the computer to output an error list of the errors or potential errors detected by the analyzer.

2. A static debugging tool according to claim 1 further comprising a decompiler for causing the computer to decompile the binary program file and translate the binary program file into an intermediate, machine independent program file that serves as the representation of the binary program file to be analyzed by the analyzer of the static debugging tool.

3. A static debugging tool according to claim 2 further comprising a hint file for providing user information to the static debugging tool that is specific to the binary program file being decompiled.

4. A static debugging tool according to claim 1 further comprising a system call and restrictions library file for providing information to the static debugging tool which is specific to a particular system with which the binary program file is designed to be used.

5. A static debugging tool according to claim 1 wherein the static debugging tool includes a flow determining arrangement for determining and symbolically representing the function flow of the representation of the binary program file.

6. A static debugging tool according to claim 5 wherein the static debugging tool includes an arrangement for identifying when and how each function calls any other functions within the representation of the binary program file.

7. A static debugging tool according to claim 6 wherein the analyzer detects the errors and potential errors in the representation of the binary program file by following all of the possible flow paths of the representation of the binary program file while tracking the use of various program parameters for any inconsistent use of the various program parameters throughout the representation of the binary program file.

8. A static debugging tool according to claim 7 wherein the analyzer includes an arrangement for checking for the return of an automatic address within the representation of the binary program file.

9. A static debugging tool according to claim 7 wherein the analyzer includes an arrangement for checking for any inconsistent use of certain variable types within the representation of the binary program file.

10. A static debugging tool according to claim 6 wherein the analyzer symbolically executes a symbolic representation of the binary program file to detect the presence of program errors and potential errors in the binary program file.

11. A static debugging tool according to claim 10 wherein values of certain variables and the relationship between certain variables are symbolically tracked to detect the presence of program errors and potential errors in the binary program file.

12. A static debugging tool according to claim 1 wherein the analyzer uses binary decision diagrams to symbolically represent certain operations of certain functions of the binary program file.

13. A method of detecting program errors or potential program errors in a binary program file, the method comprising the steps of:

statically analyzing representation of the binary program file to detect program errors and potential program errors without executing the binary program file by searching through the binary program file while tracking the use of various program parameters for any inconsistent use of the various program parameters throughout the binary program file, wherein the representation of the binary program includes an intermediate file that represents the binary program file and includes flow paths and flow structure associated with the binary program; and outputting an error list of the errors or potential errors detected during the analyzing step.

14. A method according to claim 13 wherein the binary program file includes a plurality of functions having a particular function flow structure which is intended to control the flow of the program during the execution of the program and wherein the step of analyzing the representation of the binary program file includes the step of searching through the representation of the binary program file following multiple flow paths of the function flow structure while tracking the use of various program parameters for any inconsistent use of the various program parameters throughout the binary program file.

15. A method according to claim 13 further comprising the step of decompiling the binary program file to create a machine independent, intermediate file to be analyzed in the analyzing step.

16. A method according to claim 15 wherein the step of decompiling the binary program file and creating an intermediate file representing the binary program file includes the step of using binary decision diagrams to symbolically represent certain arguments of the binary program file.

17. A computer readable medium having program instructions for:

causing a computer to statically analyze a representation of a binary program file that takes the form of an intermediate program file that includes flow paths and flow structure associated with the binary program, to detect the presence of program errors or potential program errors in the binary program file without executing the binary program file; and causing the computer to output an error list of the errors or potential errors detected.

18. A computer readable medium according to claim 17 further including instructions for causing the computer to decompile the binary program, file and translate the binary program file into an intermediate, machine independent program file that constitutes the representation of the binary program to be analyzed by the analyzing instructions.

19. A computer readable medium according to claim 18 further including instructions for determining and symbolically representing the function flow of the binary program file.

20. A computer readable medium according to claim 19 further including instructions for identifying the calls within the binary program file and symbolically representing the structural relationships of the calls.

21. A computer readable medium according to claim 20 wherein the analyzing instructions include instructions for following all of the possible flow paths of the binary program file while tracking the use of various program parameters for any inconsistent use of the various program parameters throughout the binary program file.

22. A computer readable medium according to claim 19 wherein the analyzing instructions include instructions for symbolically executing a symbolic representation of the binary program file to detect the presence of program errors and potential errors in the binary program file.

23. A static debugging tool according to claim 22 wherein the analyzing instructions include instructions for symbolically tracking values of certain variables and the relationship between certain variables to detect the presence of program errors and potential errors in the binary program file.

24. A computer readable medium according to claim 17 wherein the analyzing instructions include instructions for using binary decision diagrams to symbolically represent certain operations of certain functions of the binary program file.

* * * * *